Sept. 11, 1951     W. A. BEDFORD, JR     2,567,903
EMBOSSMENT MOUNT FASTENER WITH CLIP ATTACHMENT
Filed March 9, 1948
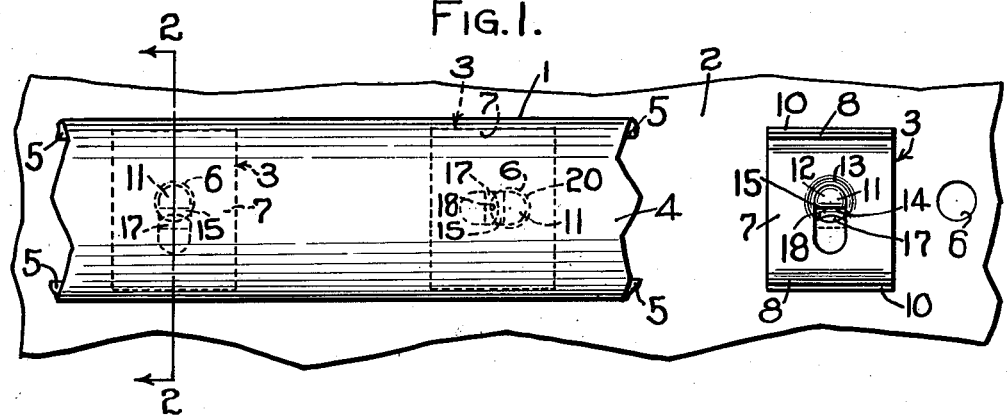
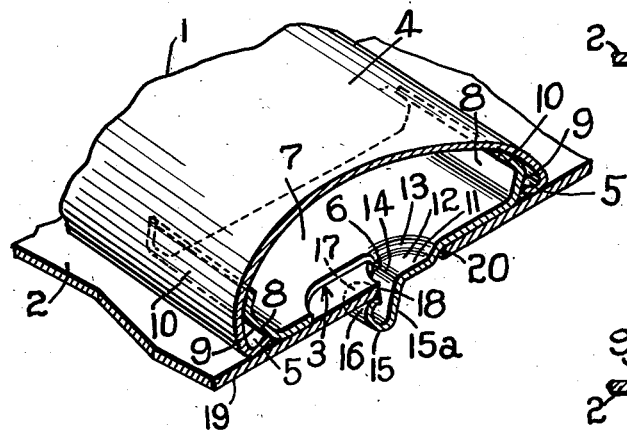
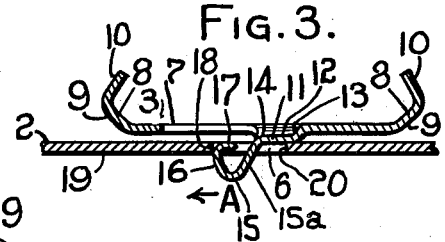
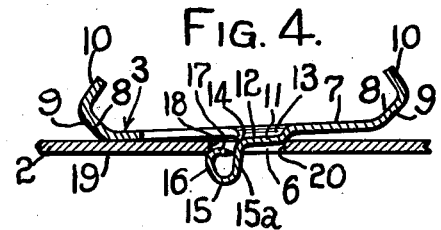
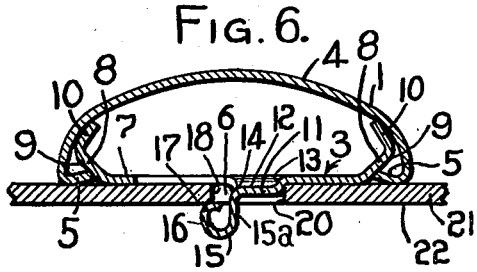
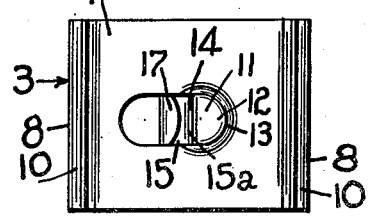
*INVENTOR:*
WILLIAM A. BEDFORD JR.
BY
*John Todd*

Patented Sept. 11, 1951

2,567,903

UNITED STATES PATENT OFFICE 2,567,903

EMBOSSMENT MOUNT FASTENER WITH CLIP ATTACHMENT

William A. Bedford, Jr., North Scituate, Mass., assignor to United-Carr Fastener Corporation, Cambridge, Mass., a corporation of Massachusetts Application March 9, 1948, Serial No. 13,781

2 Claims. (Cl. 24—73)

This invention relates to an improved fastener device for securing an article such as a molding or the like to a supporting panel.

One object of my invention is the provision of a one-piece fastener member of simple construction designed for positive attachment to an apertured support in a way to seal substantially an aperture thereof.

Another object is the provision of a fastener member constructed in a way to enable the same to be attached securely to supports of varying thicknesses.

Other objects and uses of my invention will be apparent from inspection of the drawings and specification hereinbelow set forth.

Referring to the drawing in which I have illustrated a preferred embodiment of my invention:

Fig. 1 is a plan elevation of a preferred fastener installation including a supporting panel and a trim molding secured to the panel by means of my improved fastener member;

Fig. 2 is an enlarged section taken along the line 2—2 of Fig. 1;

Figs. 3 and 4 are sectional views showing the steps in assembling my improved fastener member with a supporting panel;

Fig. 5 is a section similar to Figs. 3 and 4 showing the fastener in final attachment to the supporting panel;

Fig. 6 is a view similar to Fig. 5, but showing the fastener secured to a support of greater thickness and engaged with a hollow molding; and Fig. 7 is a bottom plan view of my fastener member per se.

Referring to Fig. 1, I have shown an article to be supported, which in my preferred form is a hollow molding trim strip 1, secured to a supporting panel 2 by means of my improved fastener members 3. The molding strip 1 is preferably of the type commonly used for trimming the exterior surfaces of automobiles, refrigerators, and the like and comprises a front portion 4 which is bowed in transverse cross section. Inwardly turned flanges 5 are provided at the transverse ends of the front portion which extend along substantially the entire length of the molding strip. The free ends of the flanges 5 terminate in spaced relation providing an opening along the length of the molding strip. The supporting panel 2 may be of metal, plastic, or the like, and is formed with a series of circular apertures 6 arranged in a line, in my preferred installation, to receive the fastener members 3 which operate to secure the molding strip to the panel.

Referring to my improved fastener member per se, I have illustrated in Figs. 3 to 7 a fastener of simple one-piece construction comprising a base 7 which may be of generally rectangular shape. Wing elements 8 integrally joined to opposed edges of the base 7 extend outwardly from the plane 8 thereof. The elements 8 provide diverging elements 9 adjacent the base 7 and converging portions 10 adjacent their outer ends. As a means for securing the fastener to the supporting panel, I have provided an attaching portion which is preferably formed entirely from material within the marginal edges of the base 7 and which extends out of the plane of the base on the other side thereof from the wing elements 8. The attaching portion comprises an embossed portion 11 which is preferably of relatively shallow depth and constructed in the form of a segment. The embossed portion 11 provides a bottom portion 12 integrally joined to the base portion 7 by walls 13 which form the arc of the segment. The size of the segment in my preferred form is slightly greater than a semicircle and the radius of the segment is slightly less than the radius of the aperture 6 of the supporting panel for the purpose to be described. The free edge 14 of the bottom portion 12 which corresponds to the cord of the aforementioned segment is spaced from the plane of the base 7 and a resilient tongue element 15 is integrally joined thereto. The tongue element 15 has a width which is less than the diameter of the aperture 6 of the supporting panel and provides a relatively straight portion 15a which extends normally from the edge 14 at an acute angle with respect to the plane of the base 7. The free end of the portion 15a is turned back upon itself to form a curled or reversed-bend portion 16. In my preferred form the reverse-bend portion 16 is curled back sufficiently to form a radius 17 normally substantially tangent to a plane parallel to the base portion 7.

In attaching the fastener 3 to the supporting panel, the fastener is first moved into the position shown in Fig. 3 with the tongue portion 15 received in the opening 6 of the panel. As pressure is exerted on the fastener in the direction of the arrow A of Fig. 3, the portion 16 of the tongue 15 engages the wall 18 adjacent the aperture 6 camming the tongue 15 away from the base portion 7 to permit the radius 17 to engage the lower side 19 of the supporting panel under the tension set up in the straight portion 15a at its junction with the edge 14. During this action the embossed portion 11 snaps into the aperture 6 thereby engaging the wall portions 13 with the walls 20 of the supporting panels surrounding the aperture 6 as most clearly shown in Fig. 5. When the fastener is finally secured to the plate, the embossed portion 11 serves to seal substantially the aperture 6 of the support and the walls 13 act as a locking means to hold the tongue 15 in spring engagement with the rear surface 19 of the supporting panel 2.

The construction of the tongue 15 of my fastener member wherein it is reversely bent at its free edge permits the fastener to be universally applied to supporting panels varying slightly in thickness. Thus, in Fig. 6, I have illustrated the fastener applied to a panel 21 of greater thickness than the panel 2 of Figs. 3 to 5. When the fastener is applied to a thicker panel, the straight portion 15a of the tongue 15 is expanded to a position forming a greater angle with respect to the plane of the base 7, but still effecting a resilient engagement between the reverse-bend portion 16 and the lower surface 22 of the panel 21.

In the preferred installation which I have illustrated, the fastener is constructed in a way to secure a molding 1 to the supporting panel. In effecting assembly of the molding with the fastener, the wings 5 of the molding are first placed in engagement with the converging portions 10 of the wing elements 8. When pressure is exerted on the top portion 4 of the molding in the direction of the supporting panel, the wing elements 8 move toward each other permitting the flanges 5 of the molding to pass by the widest points between the wings after which the wings expand to lock the flanges 5 behind the diverging portions 9.

While I have illustrated my improved fastener member in combination with a hollow molding, it is understood that, without departing from the scope of the invention, modifications could be made in the form of the article-securing portions of the fastener which would effect the attachment of articles other than moldings to the supporting panel.

Although I have illustrated and described one preferred embodiment of my invention, I do not wish to be limited thereby as the scope of my invention is best defined in the appended claims.

I claim:

1. A fastener for securing a part to a support having an aperture of substantially equal width and length, said fastener being formed from sheet material and comprising a base portion having a flat surface for engaging a face of a support, fastener means extending from said base portion opposite said flat surface for engaging a part to be supported, and an attaching portion comprising an embossment formed on said base portion providing sloping walls extending angularly from said flat surface disposed for camming engagement on three sides with the edges of a support aperture having substantially equal width and length and an integral resilient tongue cut from the material of said base portion, extending from the base of said embossment at an acute angle to said base portion, and providing an end portion curling over toward said base portion and under to provide a convex surface for receiving and engaging an edge on the fourth side of the aperture in such support and the marginal surface adjacent said edge opposite the face to be engaged by the base portion.

2. A fastener for securing a part to a support having a substantially circular aperture, said fastener being formed from sheet material and comprising a base portion having a flat surface for engaging a face of a support, fastener means extending from said base portion opposite said flat surface for engaging a part to be supported, and an attaching portion comprising an embossment formed on said base portion providing sloping walls extending angularly from said flat surface disposed for camming engagement with the edges of a substantially circular aperture in a support on an arc of at least 180 degrees and an integral resilient tongue cut from the material of said base portion, extending from the base of said embossment at an acute angle to said base portion, and providing an end portion curling over toward said base portion and under to provide a convex surface for engaging an edge of the aperture in such a support opposite the edges engaged by said sloping surface on a face of the support opposite to that engaged by the flat surface of said base portion.

WILLIAM A. BEDFORD, Jr.

REFERENCES CITED

The following references are of record in the file of this patent:

UNITED STATES PATENTS

| Number | Name | Date |
|---|---|---|
| 2,141,700 | Tinnerman | Dec. 27, 1938 |
| 2,165,928 | Krischer | July 11, 1939 |
| 2,208,727 | Marshall | July 23, 1940 |
| 2,233,071 | Bangs | Feb. 25, 1941 |
| 2,324,654 | Tinnerman et al. | July 20, 1943 |